(12) United States Patent
Belgum et al.

(10) Patent No.: US 9,239,443 B2
(45) Date of Patent: Jan. 19, 2016

(54) LINEAR OPTICAL FILTER SYSTEM AND METHOD

(75) Inventors: Jack H. Belgum, San Anselmo, CA (US); Frederick Siedenburg, Kentfield, CA (US)

(73) Assignee: SUTTER INSTRUMENT COMPANY, Novato, CA (US)

(*) Notice: Subject to any disclaimer, the term of this patent is extended or adjusted under 35 U.S.C. 154(b) by 83 days.

(21) Appl. No.: 13/489,402

(22) Filed: Jun. 5, 2012

(65) Prior Publication Data

US 2013/0321921 A1 Dec. 5, 2013

(51) Int. Cl.
*G02B 27/00* (2006.01)
*G02B 7/00* (2006.01)
*G02B 26/00* (2006.01)

(52) U.S. Cl.
CPC .............. *G02B 7/006* (2013.01); *G02B 26/007* (2013.01)

(58) Field of Classification Search
CPC .................... G02B 7/003–7/006; G02B 21/06; G02B 6/357; G02B 6/358; G02B 6/3582; G02B 6/3564; G02B 6/3566; G02B 6/3568; G02B 6/3574; G02B 26/001
USPC ................. 359/230, 233, 8, 359, 484, 489.19, 359/491.01, 577–590, 723, 308, 885–892; 351/213, 233; 353/20; 362/282, 283, 362/284
See application file for complete search history.

(56) References Cited

U.S. PATENT DOCUMENTS

| | | | |
|---|---|---|---|
| 3,883,243 A * | 5/1975 | Weisglass et al. | 355/35 |
| 4,176,916 A * | 12/1979 | Carpenter | 359/589 |
| 4,993,809 A * | 2/1991 | Leib et al. | 359/19 |
| 5,194,993 A * | 3/1993 | Bedzyk | 359/813 |
| 5,506,731 A * | 4/1996 | Smiley | 359/822 |
| 5,936,785 A * | 8/1999 | Do et al. | 359/822 |
| 6,700,690 B1 * | 3/2004 | Buchsbaum et al. | 359/230 |
| 6,850,358 B2 * | 2/2005 | Birk et al. | 359/305 |
| 7,265,835 B1 * | 9/2007 | Herzinger et al. | 356/364 |
| 8,011,791 B2 * | 9/2011 | Hsiung et al. | 353/84 |
| 2003/0107829 A1 * | 6/2003 | Kouno | 359/892 |
| 2004/0246448 A1 * | 12/2004 | Ogawa et al. | 353/84 |
| 2007/0273877 A1 * | 11/2007 | Kawano et al. | 356/318 |
| 2008/0024650 A1 * | 1/2008 | Nomura et al. | 348/348 |
| 2009/0195868 A1 * | 8/2009 | Lytle et al. | 359/385 |
| 2009/0268288 A1 * | 10/2009 | Prendergast | 359/480 |
| 2010/0046076 A1 * | 2/2010 | Feke et al. | 359/578 |
| 2010/0157247 A1 * | 6/2010 | Grover et al. | 351/213 |
| 2011/0058256 A1 * | 3/2011 | Brown et al. | 359/578 |
| 2011/0267678 A1 * | 11/2011 | Erdogan et al. | 359/290 |

OTHER PUBLICATIONS

Spring, "Confocal Microscope Objectives", Mar. 2, 2012, http://web.archive.org/web/20120302202523/http://www.olympusmicro.com/primer/techniques/confocal/confocalobjectives.html.*

* cited by examiner

*Primary Examiner* — Bumsuk Won
*Assistant Examiner* — Collin X Beatty
(74) *Attorney, Agent, or Firm* — Kilpatrick Townsend & Stockton LLP

(57) ABSTRACT

An optical system and method for illuminating an object under investigation with filtered light is disclosed. In one embodiment, the system comprises a linear filter array having a plurality of elongate variable bandpass filters. The variable bandpass filters each have a cam follower and are translatable along a longitudinal axis, whereby translation brings a selected filter in line with a beam of light. The cam follower of selected filter engages a cam adjacent to the array. This causes tilting of the filter to a desired angle thereby allowing precise selection of the bandpass frequency of the selected filter. Preferably, the filter can be tilted by an angle of up to 60°. Each elongate filter is preferably substantially rectangular and has a long dimension that is at least about twice the short dimension.

5 Claims, 7 Drawing Sheets

LINEAR OPTICAL FILTER SYSTEM AND METHOD

FIELD OF THE INVENTION

The present invention relates to an optical filtering system and method, and particularly relates to a system and method for illuminating or observing an object of interest through a user selected variable bandpass filter.

BACKGROUND

In scientific research, as well as in other applications, it is often desired to illuminate an object of interest, such as a biological specimen, with filtered light, or to filter the light collected from the object. As a simple example, a specimen may be dyed with a florescent substance or marker and illuminated by light of a particular wavelength to effectuate the desired florescence. Likewise, it is often desirable to observe light emissions from an object under investigation through a filter, for example, when the light emitted from the object comprises a specific characteristic wavelength. Thus, the experimenter may wish to irradiate the object with filtered light to excite a florescent dye and/or observe the light collected from the object through a filter to ascertain its emission characteristics.

The use of interference gratings that allow only transmission of a very narrow band of light wavelengths is a well known method of filtering light. Such filters may be referred to as bandpass filters. Typically, white light is filtered to produce the desired wavelength for illuminating the object under investigation, or collected light is filtered to eliminate everything other than light at an emission wavelength of interest. As used herein, the term "light" is intended to have broad meaning and to encompass not only visible light but also infrared and ultraviolet light subject to filtering. Likewise, as used herein, the term "white light" is intended to have broad meaning.

In many research applications, the object under investigation is very small, such that a microscope is necessary to conduct the desired experiment or procedure. In such cases, and in others, space is at a premium and it is desirable to make the various hardware systems used to conduct the investigation as compact as possible. Such hardware systems may include, for example, optical systems for illuminating a specimen, mechanical systems such as micromanipulators and the like to position the specimen, microscopy systems and probe systems for observing and making measurements of the specimen, recording systems for acquiring data and images, and control systems for operating and coordinating the hardware.

A modern optical microscope typically has an objective lens which collects the light from the object under study and a tube lens which focuses the image for viewing and/or photographic recording. It will be understood by those skilled in the art that the term "lens" as used herein comprises compound lens systems. In many modern microscopes, the objective lens collimates the light, and the space between the objective and tube lenses is sometimes referred to as the "infinity space" because the light is collimated in this region, i.e., it has a infinite focal length. While there is no theoretical limit to the length of the infinity space, as a practical matter it is impossible to attain perfect collimation of light, and so the length of the useable infinity space in commercially available microscopes is usually limited to less than about 8 centimeters. The infinity space is a particularly convenient place to insert filters, beam splitters, polarizers, etc., however any such items need to be quite compact to fit in the limited area available.

It is known that the range of bandpass frequencies of an optical interference filter shifts as a function of the angle of incidence of the light directed onto the filter. Recently, interference filters have been developed taking advantage of this property over a broad range of angles without substantial loss of the desired bandpass properties. Hence, these newly developed filters are "tunable" over a substantial range of wavelengths by changing the angle of incident light. Such filters remain useful at angles of up to 60 degrees relative to the light path. It will be appreciated that it is best if the light passing through such a filter is collimated, as is the case in the infinity space of a microscope, such that all of the rays have substantially the same angle of incidence.

Filter wheels, useful in many applications, are well known. Basically, a filter wheel comprises a plurality of optical filters mounted on a disc-shaped "wheel" that is rotatable about a central axis. By rotating the wheel any of the filters can be positioned by the user in the light path, thereby allowing the user to select (from among the filters) the wavelength of light used to illuminate the specimen. Such filters wheels are available, for example, from Sutter Instrument Company of Novato, Calif., (www.sutter.com) assignee of the present invention.

Recently, the assignee of the present invention has developed a filter wheel incorporating filters, wherein at least one, and preferable all, of the filters on the wheel are tunable. A filter wheel using tunable bandpass filters is disclosed in the assignee's U.S. application patent Ser. No. 13/162,904, the disclosure of which is incorporated by reference. While the filter wheel described in this prior application has proven successful for many applications, the inventors hereof have determined that in some instances an even more compact arrangement would be desirable, particularly for use with microscopes. In the embodiment that has been developed (as described in the above-referenced patent application), the filter wheel is rotatable about two axes, namely, a first axis that is perpendicular to the center of the wheel (as in past filter wheels), and a second axis that is in the same plane as the wheel disk and runs through the center of the disk. This second axis allows adjustment of the bandpass frequencies, in the manner described, by allowing the filter to be rotated relative to the incident light.

Quite often the same microscope may be used in connection with experiments involving more than one illumination and/or emission wavelength, either during a single experiment or in different experiments. Thus, it is desirable to be able to vary the bandpass characteristics of a filter apparatus with minimal effort and delay. Moreover, in many research applications it is beneficial to filter light at some times, while at other times to leave it unfiltered. For example, the light collected from an object undergoing microscopic examination may be left unfiltered such that is illuminated by white light when manipulating, preparing or handling the object and, thereafter, filtered to illuminate it with a selected frequency or when looking for characteristic emissions. As noted above, however, the space used for the investigation may be very limited, making difficult to place and remove filters. In order to enable an experiment to proceed efficiently, it is often desirable to quickly adjust the filter characteristics and to quickly switch between filtering and not filtering the collected light.

SUMMARY OF THE INVENTION

In one aspect the present invention is directed to a filter system having a plurality of optical filters disposed in a linear array generally defining a plane, a transport mechanism for moving the filter array back and forth along a linear path for positioning a selected filter in a light beam, such that the light beam passes through the selected filter, and a tilting mechanism cooperating with said filters for tilting the selected filter by a selected angle relative to said plane, where the selected angle is between 0 and 60 degrees. Some or all of the filters are variable bandpass filters, with a bandpass range that varies as a function of the angle of incidence of the light beam. In one embodiment the tilting mechanism comprises a stationary cam. In this embodiment each filter comprises a cam follower proximate an end thereof for engaging said cam, such that the angle of filter relative to the light beam may be adjusted by moving the filter relative to the cam. Preferably each of the filters is spring loaded and has a substantially identical generally rectangular shape defining long and short edges, wherein the long edges of each said filter are disposed parallel to the linear path. Preferably, the length of said long edges of each said filter is at least twice the length of the short edges. The transport mechanism may comprise a linear stepper motor. In another embodiment each of the filters has a pin proximate an end thereof, and the tilting mechanism comprises a stationary rail having a groove therein for engaging said pins, wherein the groove causes said filters to tilt up and down as the filter array moves along said linear path. In yet another embodiment, the lifting mechanism comprises a moveable rod that engages an edge of a filter in registration therewith and an actuator for moving the rod up and down, whereby the filter can be tilted by a desired angle.

In another aspect the present invention comprises a variable bandpass filter system having a plurality of substantially rectangular bandpass filters defining long and short edges, mounted to form a generally planar linear array defining a longitudinal axis, wherein the long edges of the filters are parallel to said longitudinal axis, wherein the bandpass range of at least one of said filters varies as a function of the angle of incident light, and wherein the long edges of each said filter are at least twice as long as the short edges, a linear stepper motor coupled to said linear filter array to transport said array along said longitudinal axis, a cam follower positioned proximate to a long edge of each said filter, and a stationary cam positioned adjacent to said filter array to engage said cam followers such that said filters tilt up and down as they move relative to said cam. Preferably, filter array comprises a sufficient number of variable bandpass filters to cover the entire visual light spectrum, and each of said filters is spring-loaded.

In yet another aspect, the present invention is directed to a method of filtering a beam of light, comprising disposing a selected one of a linear array comprising a plurality of variable bandpass filters in the beam of light using a linear actuator, the bandpass range of each said variable bandpass filter being a function of the angle of incident light, tilting said selected bandpass filter using a stationary cam such that it intercepts the beam of light at a desired angle, such that bandpass range of the filter disposed in the beam of light is selected. The step of disposing a selected one of said filters may be performed using a linear stepper motor, and the step of tilting the selected filter may comprise engaging the stationary cam with a cam follower positioned proximate an edge of said filter. In one embodiment the beam of light is generally circular with a diameter of at least about 25 mm. Preferably, step of tilting comprises moving the filter such that it intercepts said beam of light at an angle of up to 60 degrees. The linear array may be disposed in the infinity space of a microscope.

DETAILED DESCRIPTION

Figure 1:
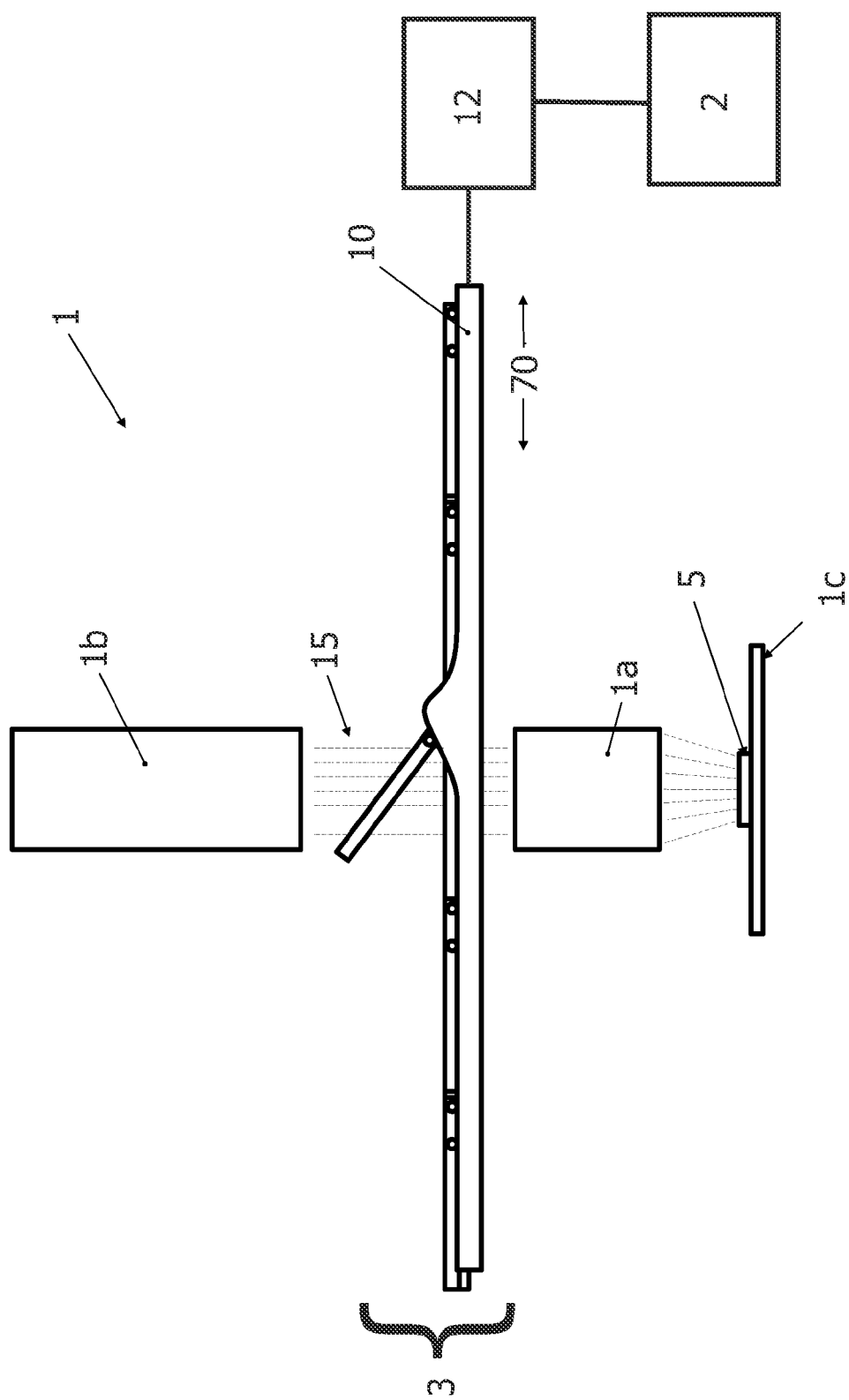
FIG. 1 is a somewhat schematic view of an optical microscope with a filter system of the present invention placed in the infinity space thereof.

FIG. 1 is a is a somewhat schematic view of a microscope having a filter system of the present invention. Microscope 1, which is not considered part of the present invention, comprises an objective lens 1a, a tube lens 1b and a stage 1c for holding an object under examination 5. The infinity space 3 lies between the objective lens 1a and the tube lens 1b. A linear filter array 10 of the present invention, described in detail below, is positioned in the infinity space 3 in the light beam 15 between the lenses. As described above, light 15 in the infinity space is collimated. One or more other optical components, such as a beam splitter, may also be placed in the light path in the infinity space. However, for clarity no other components are shown. Linear filter array 10 may be moved back and forth along axis 70 perpendicular to light beam 15 using linear drive 12 under the control of control system 2, as described below, thereby positioning a selected filter in the light path.

Figure 2:
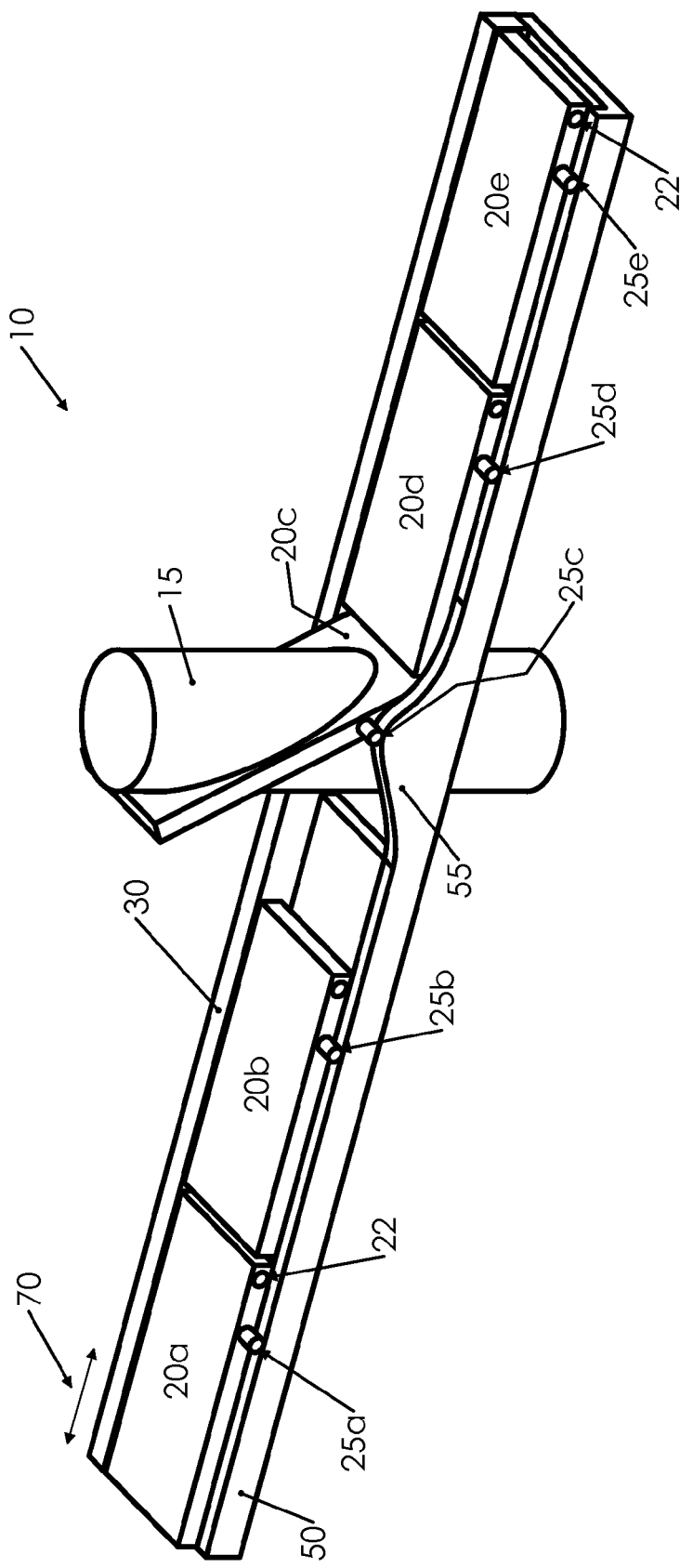
FIG. 2 is a somewhat schematic isometric view of an embodiment of the filter system of the present invention.

FIG. 2 is a somewhat schematic isometric view of an embodiment of a filter system 10 of the present invention. Filter system 10 comprises a plurality of optical bandpass filters 20a-20e, mounted in a linear array. Collectively and generically the filters of filter system 10 will be referred to filters 20 or filter array 20. Although five filters (20a-20e), are shown in FIG. 2, the number of filters used in accordance with the present invention is a matter of design choice. Using current technology, five tunable bandpass filters are sufficient to cover the visible light spectrum, i.e., this number of filters allows the experimenter to selectively pass any desired visible light frequency. The filter array generally defines a plane.

Filters 20 are rotatably attached to a first movable rail 30 using pivot pins 22 mounted on at least one side thereof near an end of each filter. For clarity only one rail is shown in FIG. 2, but a system having rails on both sides of the filter array may be used. Other, more complex, mechanical arrangements are also possible. In a preferred embodiment, cam followers 25a-25e are positioned at one edge of each filter 20, also near an end of the filter but slightly inward from the pivot pin. Cam followers 25 rest on stationary cam rail 50 comprising a cam 55. Cam rail 50 may be used to support the filters on the side opposite rail 30. Alternatively, a second moveable rail, not shown may be used to support the filters on this side. Cam followers 25 are preferably spring-loaded and comprise rotatable bearings.

Filter system 10 may be moved linearly back and forth in the directions of axis 70 using any suitable transport mechanism, not shown in FIG. 2. In this manner, any selected filter in filter array 20 may be brought into a position where it intercepts and, thereby, filters collimated light beam 15. In one embodiment a linear stepping motor coupled to filter array 10 (for example, connected to rail 30) is used to achieve precise positioning of the filter array along axis 70. For example, a stepping motor having 4 whole steps (32 microsteps) per millimeter of travel has been found to provide highly precise positioning. Other transport mechanisms, such as a lead screw coupled at one end to any type of precision motor (such as a servo) and at the other end to filter array 20, may be used. Likewise, a solenoid can be used to translate the filter array back and forth along axis 70.

As filter array 20 is moved along axis 70 cam followers 25 engage cam 55, which is shaped to cause filters 25 to tilt up and down as they pass over the cam during axial movement. In this manner it is possible to tilt a selected filter at a precise angle relative to light beam 15, and thereby precisely control the bandpass range of the filter. Preferably, the filters can be tilted at an angle of up to 60 degrees relative to the plane defined by the filter array. In order to allow the full light beam 15, to pass through the filter when it is tilted, filters 20 need to be elongated in the direction of tilt. Accordingly, each filter is substantially rectangular with the length of the long edges of the rectangle being at least about twice the length of the short edges, so that when the filter is tilted by 60 degrees relative to the plane of the filter array it can accommodate a circular light beam. Thus, for a 25 mm diameter beam the filters should be at least 25 mm×50 mm.

Figure 3:
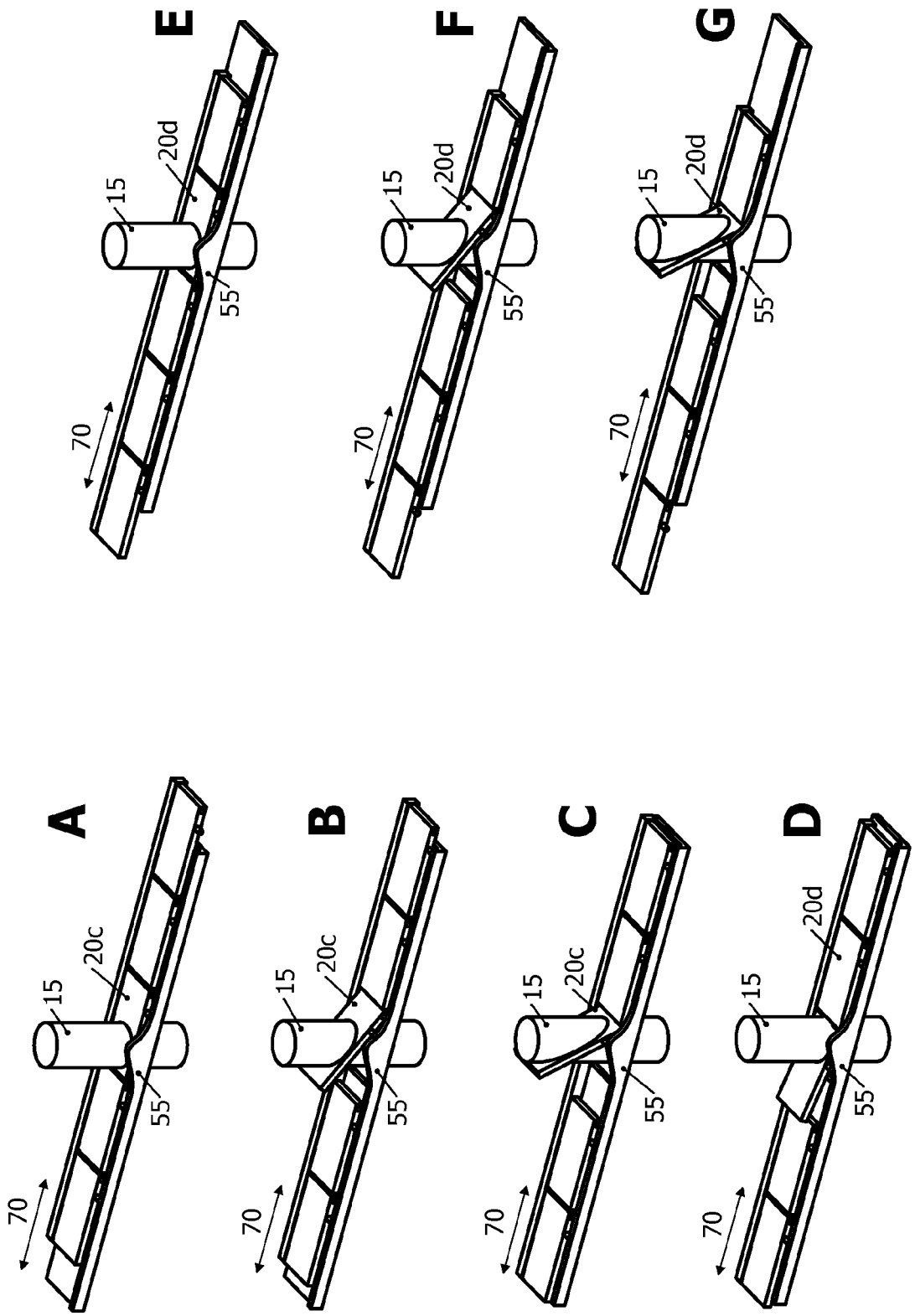
FIG. 3A-3G are somewhat schematic isometric views depicting the filter array of the present invention in various positions as it is translated along its longitudinal axis.

Cam 55, filter array 20 and light beam 15 are positioned relative to one another such that each filter can be brought into the path of the light beam over the entire range of tilt. In other words, when the beam is near one end of the filter, the filter remains flat (0° tilt) and when the filter is moved, such that the beam is near the other end, the filter is fully tilted (60° tilt). This is depicted in FIG. 3 showing a sequence of seven positions (A-G) of filter array 20 as it moves along axis 70 from left to right (relative to the figure). At position A, light beam 15 passes through filter 20c while the filter lies flat, i.e., at this point, cam follower 25c has not yet engaged cam 55. The light beam passes through the left end of the filter relative to FIG. 3. At position B, cam follower 25c has engaged cam 55 causing filter 20c to tilt upward by about 30°. Light beam 15 is more centered relative to filter 20c, but is still more to the left end. At position C, filter 20c is fully tilted to its maximum of 60° and cam follower 25c is at the top of cam 55. Light beam 15 is relatively centered as it passes through the tilted filter. Position D shows an intermediate positioning of the filters. Specifically, filter 20c lowers as it is moved out of the path of beam 15 and filter 20d is moved into the path. Position E is similar to position A, except that now filter 20d now intercepts beam 15. Likewise, positions F and G are similar to positions B and C, respectively, except that filter 20d is being tilted as it filters the beam. Although seven positions are shown for exemplary illustration of the operation of the present invention, it will be understood that there is no practical limit to the number of positions, and that any of the filters in filter array 20 can be brought into alignment with beam 15 and tilted to substantially any desired angle between 0° and 60° to achieve a desired bandpass range.

The shape of cam 55 may be smoothly continuous so that filters 20 tilt up and down smoothly as they travel past the cam without any bumps or discontinuities that could cause vibrations or excess wear.

While not shown because it is not considered part of the present invention, those skilled in the art will appreciate that additional optics will be used to collimate light beam 15 before it reaches the filter array, and to focus the filtered light on an object to illuminate the object with light having a narrow range of wavelengths determined by the characteristics and angle of the selected filter. Filtered light may be used, for example, to cause a chemical in or on the object to fluoresce. Many optical components and combinations of components are known to those skilled in the art for collimating and focusing light, and the selection of optical elements is a matter of design choice. Likewise, a variety of suitable light sources are known in the art and may be used in connection with the present invention. It is contemplated that in most instances the light source and some of the optics will be part of a user's microscope system or otherwise provided by the user rather than being integrated into the filter system. There is no intention to limit the present invention to any particular use regarding the nature of the object under investigation or the purpose of illuminating it with filtered light.

Preferably, as depicted in FIGS. 1, 2 and 3, cam 55 is shaped to cause the filters to go up and down in both directions of travel, such the filters lie flat relative to rails 30 and 50 when they are not in the light beam. In this manner, any selected filter can be aligned with beam 15 and tilted to a desired angle, while the remaining filters are flat. Thus, in FIG. 2, filter 20c is tilted, while filters 20a, 20b, 20d and 20e are flat. This maximizes the compactness of the filter system.

Figure 4:
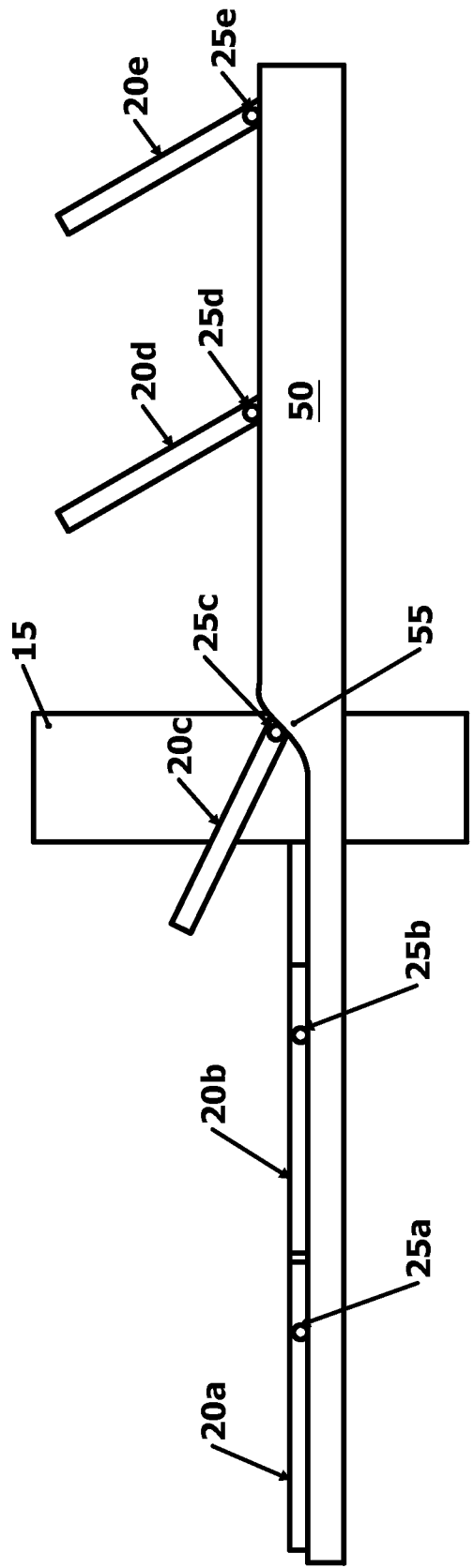
FIG. 4 depicts an alternate embodiment of a cam rail.

An alternative embodiment is depicted in FIG. 4. This embodiment has a rail 350 that is shaped such that the filters remain tilted up on one side of the beam. If space allows, this arrangement is believed to provide even faster operation and improved mechanical performance.

As noted, filters 20 are preferably spring-loaded. This ensures that the cam followers 25 maintain firm engagement with cam 50 during up and down travel, facilitating high speed positioning of the filters as selected by the user. In one prototype embodiment, any selected filter could be moved through the entire range of tilt in less than 140 milliseconds, and filter switching could be accomplished in about 200 milliseconds.

Figure 5:
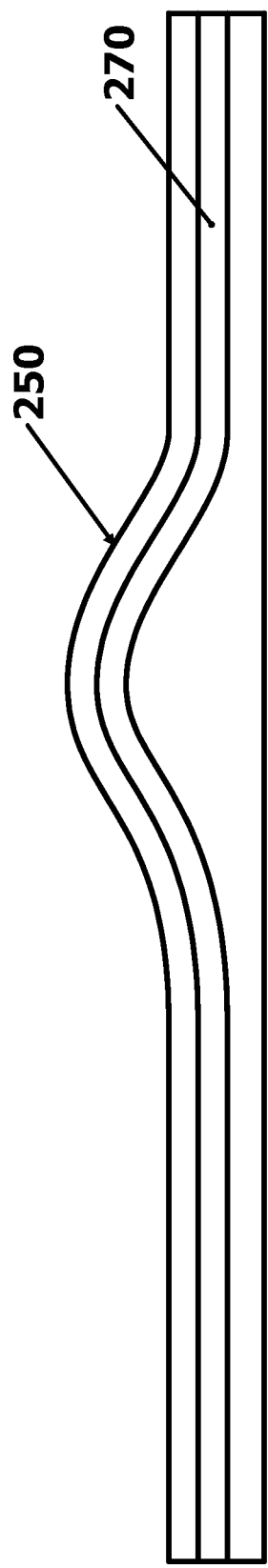
FIG. 5 depicts yet another alternate embodiment of a rail.

An alternative configuration of a cam rail 250 is depicted in FIG. 5. In this embodiment, stationary rail 250 has a groove 270 which engages pins on the filters. As the filter array moves, movement of the pins in groove 270 cause the filters to tilt up and down as they pass by the light beam, similar to the manner previously described. It will be appreciated that the groove can also be shaped such that the filters remain tilted upward on one side of the light beam, similar to the embodiment of FIG. 4.

Figure 6:
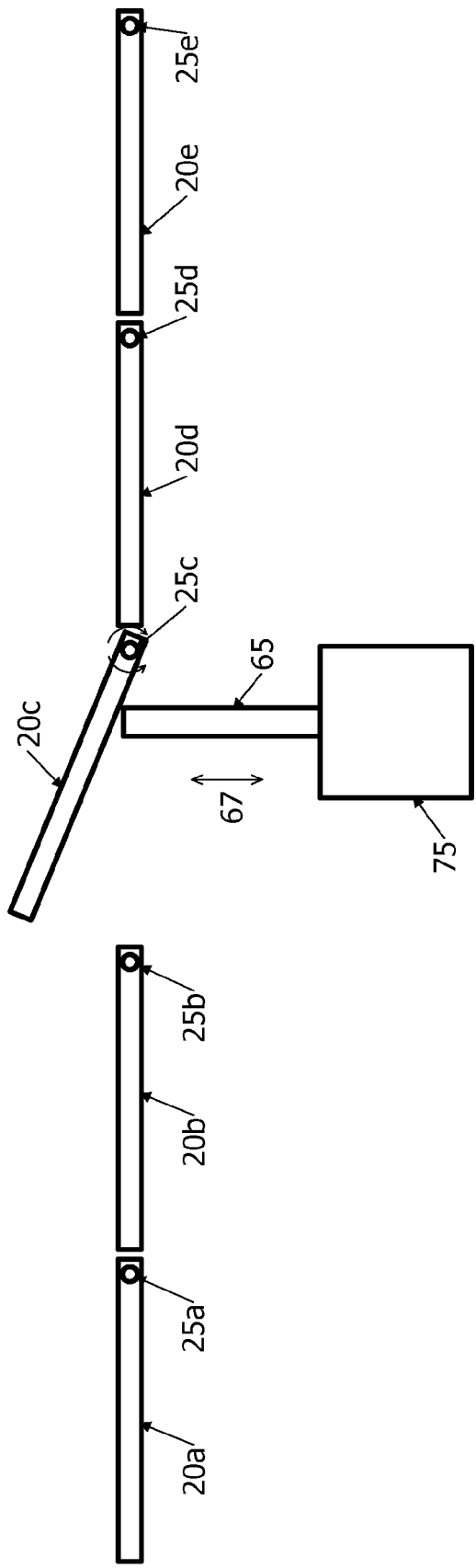
FIG. 6 depicts an alternate embodiment of a mechanism for tilting filters in accordance with the present invention.

In yet another embodiment of the present invention, depicted in FIG. 6, a separate lifting mechanism is provided to tilt the filters up and down. (For clarity, extraneous features are not shown in FIG. 6.) In this embodiment the lifting mechanism may comprise a small diameter rod 65 that is moved up and down along axis 67 using a linear drive device 75, which may be a linear stepping motor, a solenoid, or any other suitable means for precisely moving rod 65 up and down. Preferably filters 20 are spring loaded as described above to provide the impetus for downward movement as rod 65 is refracted. In operation, a selected filter is moved into position in the light beam and tilted to a desired angle using rod 65. However, this embodiment is less preferred because it requires two drive devices, whereas the other embodiments require only one.

Researchers conducting experiments using filtered light sometimes find the need to observe the object under investigation while it is illuminated with white light. While a preferred embodiment uses five bandpass filters, as depicted in FIG. 2, in some applications it may be desired to have the capability of observing the object under microscopic investigation with white light, or with other filtered light. For example, and without any intent to limit the scope of the present invention, it may be desirable to observe the object while it is illuminated with white light while it is being positioned, manipulated, probed, dyed, photographed or otherwise worked upon or observed. White light is generally more suitable for these operations because it enhances the visibility of the object or of the work area. For such applications, one or more of the filters 20 need not be a tunable bandpass filter. For example, one of the filters may be a neutral density filter which transmits light over the entire visible spectrum, i.e., white light. Or, one filter may be a band rejection filter to eliminate a particular wavelength of light from illuminating the object, thereby avoiding a particular excitation. Alternatively, white light can be transmitted by translating the entire filter array out of the path of light beam 15 or by using a different optical path not passing through the filter array.

Preferably, the present invention includes an overall control system 2 (FIG. 1) comprising a combination of computer hardware and software to allow the user to translate the filter array into a desired position, and otherwise control the elements of the present invention. Preferably, the control system may also be used to control additional elements used in the investigation, such as the light source, shutters, micromanipulators, stages, etc. that are not part of the present invention. Preferably, the control system further comprises a user friendly graphical user interface.

Figure 7:
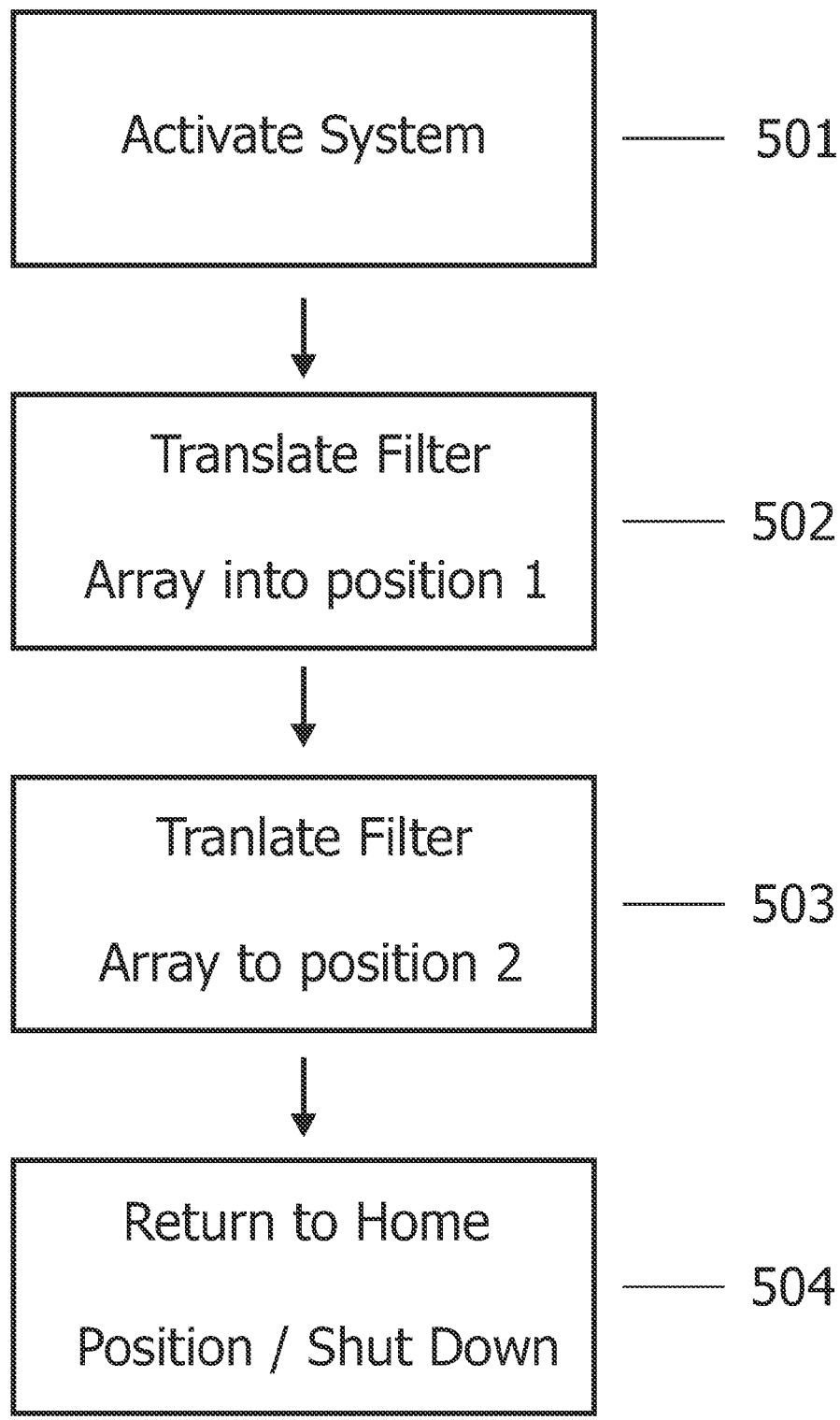
FIG. 7 is a flow chart depicting the steps of an embodiment of the method of the present invention.

A method according to the present invention is depicted in the flow chart of FIG. 7. At step 501 the system is activated. Controller 2 is preferably used to activate the system of the present invention and any other related systems used in conjunction therewith. At this step the filter array is translated to a home position (also sometimes referred to as a "rest" or "zero" position) if it is not already at the home position. Alternatively, the current position of the filter array along axis 70 may be determined without moving the array, i.e., without moving it to a home position. Activation may also include turning on the source of light used to create light beam 15, and making any necessary adjustments to the optical system. It is noted that while the light source may be turned "on" at this step, it may not be transmitted to filter array 20. Light may be prevented from reaching the filter array by a shutter or other mechanism. The system operator then enters, selects or starts an experiment or other procedure involving the use of one or more frequency bands of filtered light. The experiment or procedure may also involve other steps, not considered part of the present invention, such as moving an object under investigation into position so that it will be illuminated by the filtered light.

At step 502 the filter array, comprising a plurality of bandpass filters is translated into a first position ("position 1"), such that the correct filter intercepts the light beam at the desired angle of tilt such that only light in a desired bandpass range is transmitted. When the filter is in the correct position light that may previously have been prevented from reaching the filter (e.g., by a shutter), is allowed to pass through the filter. Alternatively, the light source may be turned "on" at this time, although this is less preferred because of the length of time typically required before the light is fully "on" and the fact that light intensity may vary over its warm-up time. Moreover, in some instances it may be desired to stop illumination of the object so that emissions can be observed through a filter.

Preferably, the filter is correctly positioned by the controller by referencing to a look-up table stored in non-volatile memory. Thus, the experimenter simply enters a desired bandpass, the controller determines the correct position of the filter array from the look-up table, and then translates filter array to the proper position to tilt the proper filter to the proper angle to obtain the selected bandpass. As noted above, this can be accomplished with very high precision in a fraction of a second.

At optional step 503 the filter array is translated to a second position if the experiment or other procedure involves observing the object under investigation with at a second frequency band of filtered light, or with white light. This may repeated as many times as desired.

At the completion of the experiment or other procedure, at step 504 the filter array may be translated to a home position before the system is shut down. Alternatively, the system may be shut down with the filter array left in whatever position it is in at the conclusion of the experiment.

The embodiments described above are illustrative of the present invention and are not intended to limit the scope of the invention to the particular embodiments described. Accordingly, while one or more embodiments of the invention have been illustrated and described, it will be appreciated that various changes can be made therein without departing from the spirit or essential characteristics thereof. Accordingly, the disclosures and descriptions herein are intended to be illustrative, but not limiting, of the scope of the invention, which is set forth in the following claims.

We claim:

1. A variable bandpass filter system comprising:
   a plurality of substantially rectangular bandpass filters defining long and short edges, said filters being generally coplanar and mounted to form a linear array defining a longitudinal axis and a lateral direction, wherein the long edges of said filters are parallel to said longitudinal axis and the short edges of said filters are parallel to said lateral direction, wherein the bandpass range of at least one of said filters varies as a function of the angle of incident light, and wherein the long edges of each said filter is about 50 mm and the short edges of each said filter is about 25 mm,
   a linear stepper motor coupled to said linear filter array to transport said array along said longitudinal axis,
   a cam follower positioned proximate to a long edge of each said filter, and a passive stationary cam positioned adjacent to said filter array to engage said cam followers such that said filters passively and automatically tilt up and down at an angle between 0 degrees and 60 degrees as the filters move relative to said cam as a result of said array being transported along said longitudinal axis.

2. The filter system of claim 1 wherein the length of each said filter is at least twice the width.

3. The filter system of claim 1 wherein said each of said filters further comprises a pin, and wherein said tilting mechanism comprises a stationary rail comprising a groove therein for engaging said pins, wherein said groove is configured such that said filters tilt passively and automatically as a result of said filter array moving along said linear path.

4. The variable bandpass filter system of claim 1 wherein said filter array comprises a sufficient number of variable bandpass filters such that every wavelength in the visible light spectrum falls within the bandpass range of at least one of the filters.

5. The variable bandpass filter system of claim 1 wherein each of said filters is spring-loaded.

* * * * *